(12) United States Patent
Ravenet

(10) Patent No.: US 9,589,681 B2
(45) Date of Patent: Mar. 7, 2017

(54) NUCLEAR FUEL ASSEMBLY BODY AND A NUCLEAR FUEL ASSEMBLY WITH SUCH A BODY

(75) Inventor: Alain Ravenet, Vinon-sur-Verdon (FR)

(73) Assignee: Commissariat a l'energie atomique et aux energies alternatives, Paris (FR)

(*) Notice: Subject to any disclaimer, the term of this patent is extended or adjusted under 35 U.S.C. 154(b) by 835 days.

(21) Appl. No.: 13/500,788

(22) PCT Filed: Oct. 5, 2010

(86) PCT No.: PCT/EP2010/064779
§ 371 (c)(1),
(2), (4) Date: Apr. 6, 2012

(87) PCT Pub. No.: WO2011/042406
PCT Pub. Date: Apr. 14, 2011

(65) Prior Publication Data
US 2012/0201343 A1 Aug. 9, 2012

(30) Foreign Application Priority Data
Oct. 8, 2009 (FR) ...................................... 09 57021

(51) Int. Cl.
*G21C 3/34* (2006.01)
*G21C 3/324* (2006.01)
*G21C 1/02* (2006.01)

(52) U.S. Cl.
CPC ............... *G21C 3/324* (2013.01); *G21C 1/02* (2013.01); *Y02E 30/40* (2013.01)

(58) Field of Classification Search
CPC .......... Y02E 30/40; G21C 1/03; G21C 3/352; G21C 11/085; G21C 11/088; G21C 3/324; G21C 3/02; G21C 3/04; G21C 3/06; G21C 1/02

USPC ................. 376/290–293, 462, 412, 426, 434
See application file for complete search history.

(56) References Cited

U.S. PATENT DOCUMENTS 3,182,003 A * 5/1965 Thorp, II et al. ............. 376/442
3,344,855 A * 10/1967 Clark ............................ 165/159
3,816,247 A * 6/1974 Cayol .................... G21C 3/324
376/434

(Continued)

FOREIGN PATENT DOCUMENTS

BE 782.079 7/1972
CN 101521048 A 9/2009

(Continued)

OTHER PUBLICATIONS

International Search Report issued Dec. 17, 2010 in PCT/EP2010/064779.

(Continued)

*Primary Examiner* — Jack W Keith
*Assistant Examiner* — Sharon M Davis
(74) *Attorney, Agent, or Firm* — Oblon, McClelland, Maier & Neustadt, L.L.P.

(57) ABSTRACT

A nuclear fuel assembly body with a lengthways axis includes first and second tubular segments made from a metal material forming the lengthways ends of the assembly body. A frame made from a metal material connects the first and second segments. The frame is openworked. A ceramic tubular internal structure is positioned between the first and second segments inside the frame.

19 Claims, 15 Drawing Sheets

(56) References Cited

U.S. PATENT DOCUMENTS

Figure 1:
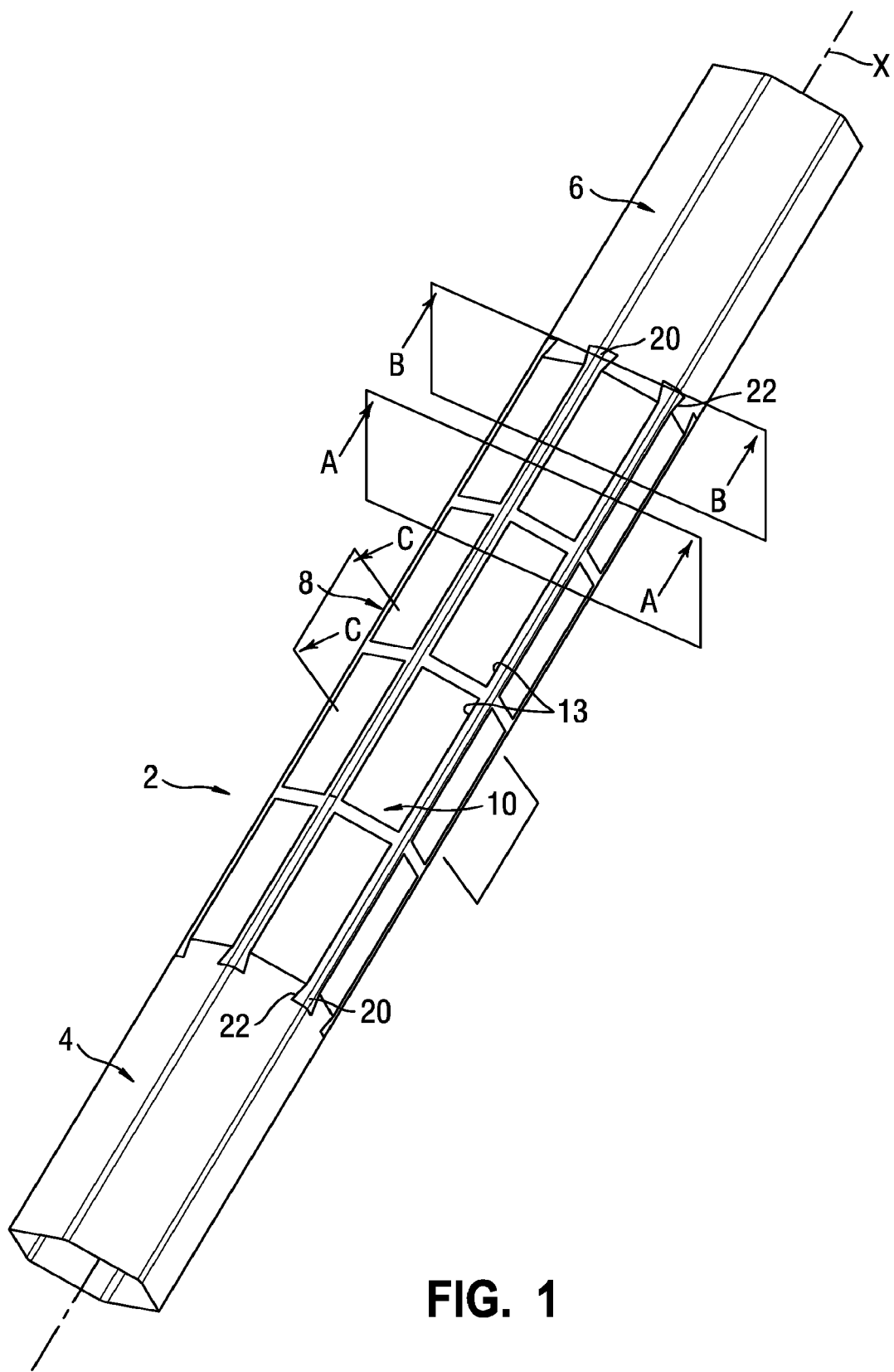

| | | | | |
|---|---|---|---|---|
| 4,117,565 | A | * | 10/1978 | Asada et al. .................... 75/229 |
| 4,142,934 | A | | 3/1979 | Wild |
| 2006/0039524 | A1 | * | 2/2006 | Feinroth ............... C04B 35/806 376/409 |
| 2006/0266450 | A1 | * | 11/2006 | Kwon et al. ................. 148/677 |
| 2008/0273650 | A1 | * | 11/2008 | Yokoyama et al. .......... 376/210 |
| 2009/0220040 | A1 | * | 9/2009 | Takagi ..................... G21C 3/07 376/416 |

FOREIGN PATENT DOCUMENTS

| | | |
|---|---|---|
| DE | 40 41 348 A1 | 6/1992 |
| FR | 2.009.838 | 2/1970 |
| FR | 2.136.901 | 12/1972 |
| FR | 2.146.976 | 3/1973 |
| FR | 2 374 727 | 7/1978 |
| GB | 1 268 186 | 3/1972 |
| GB | 1 348 453 | 3/1974 |
| GB | 1 390 892 | 4/1975 |
| GB | 80 064 C2 | 8/2007 |
| JP | 54-8288 A | 1/1979 |
| JP | 59-34395 A | 2/1984 |
| JP | 1-153997 A | 6/1989 |
| JP | 1-172797 A | 7/1989 |
| JP | 2-138898 A | 5/1990 |
| JP | 2-206796 A | 8/1990 |
| JP | 2001-194478 | 7/2001 |
| RU | 2 234 752 C2 | 8/2004 |

OTHER PUBLICATIONS

Preliminary Search Report issued May 21, 2010 in French Patent Application No. Fr 0957021 (with English Translation of Category of Cited Documents).

Office Action issued Jun. 30, 2014 in Japanese Patent Application No. 2012-532561 (with English language translation).

Combined Chinese Office Action and Search Report issued May 22, 2014, in Chinese Patent Application No. 201080055196.4 with English translation.

Guangshan Xie, et al., "Fast Neutron Reactor Fuel Element", Jun. 30, 2007, pp. 83-86 with English Abstract.

Notice of Allowance issued Aug. 27, 2014 in Russian Patent Application No. 2012118630 (with English translation).

* cited by examiner

NUCLEAR FUEL ASSEMBLY BODY AND A NUCLEAR FUEL ASSEMBLY WITH SUCH A BODY

TECHNICAL FIELD AND PRIOR ART

The present invention relates to a nuclear fuel assembly body and a nuclear fuel assembly with such a body.

Power stations which produce energy from nuclear fission reactions use fuel elements in which fission reactions occur which release caloric power.

This power is extracted from the elements by heat exchange with a heat transfer fluid which cools them.

The fuel elements are in the form of fuel pins collected into bundles, where these bundles are housed in a body, and where the entire unit forms a fuel assembly.

Different types of assembly exist, depending on the operational and performance conditions of the reactors.

As part of the development of new-design reactors, known as IVth generation reactors, fast neutron reactors cooled either by a heat transfer gas, RNR-G (Gas Heat Transfer Reactor), or by sodium, RNR-Na.

An assembly of a known type for a sodium-cooled fast neutron reactor core comprises, from base to top:
- a cylindrical foot of circular section used for positioning and holding the assembly in a pillar of the diagrid used as the core's cold sodium feed manifold. All the core's assemblies rest on the diagrid, and are positioned next to one another,
- a monolithic body consisting of a cylindrical tube of regular hexagonal section extending between the foot and the upper neutron protection which will be described below. The body contains a bundle of sheathed pins enclosing a fissile and/or fertile material, where the pins are generally kept regularly spaced,
- a cylindrical solid block of regular hexagonal section consisting of one or more materials preventing neutron leaks in the upper part of the core, where the end of this block also forms a gripper head for gripping the entire assembly. In addition, a channel traverses this block from base to top to drain off through the head the sodium flow cooling the assembly. This unit is called an upper neutron protection or PNS.

Each assembly can be removed individually, and can be removed from or installed on the diagrid according to the reactor's operational requirements, notably for operations to reload it.

In position on the diagrid, the assemblies are traversed in the core by the liquid sodium; the sodium penetrates into each assembly through the apertures designed for this purpose around the foot, and flows from base to top from the foot, and exits through the upper neutron protection whilst cooling the bundle of fuel pins or fertile pins as it passes through the body.

The current embodiments of sodium-cooled fast neutron reactors in the world have fuel assemblies with a body comprising a metal monolithic hexagonal tube, usually made of austenitic, ferritic or ferritic/martensitic stainless steel.

The body accomplishes two main functions guaranteeing the satisfactory operation of the assemblies and of the core.

Firstly, the body mechanically connects the foot to the upper neutron protection. It is thus responsible for the integrity of the assembly when it is gripped by the upper neutron protection. It also gives rigidity to the unit, enabling it to be held when the foot is assembled in the diagrid.

Secondly, the tube guides the flow of cooling fluid required to cool the fuel bundles and/or fertile bundles from base to top, and controls the hydraulic diameters in each section of the assembly. Indeed, maintenance of the hydraulic diameters is an important condition to guarantee stability of operation.

The tube's diametrical deformation must therefore be limited. It is designed so as to form a pressure tube.

The body also accomplishes secondary functions the aim of which is to make the functions of the other constituents more robust, and to raise globally the level of operational safety of the assemblies and of the core.

Since the body forms an integral part of the core, the material of which it is made is chosen so as to be a material which is neutronically compatible with obtaining a fast flow and with the volume power density sought in the core.

In addition, it provides a protective mechanical confinement of the fuel elements constituting the assembly, protecting them from all risks of damage during the lifetime of the assemblies, such as during manufacture, transport and handling, and during reactor operation and during the cycle outside the reactor as a used fuel assembly.

The hexagonal section of the tube enables a hexagonal compact network to be produced, and a high geometrical compactness of the components and, by this means, a critical mass to be obtained with a high volume density of fissile nuclei.

In addition, a material to construct the body is chosen which minimises the presence of materials which are unfavourable for neutron reactions. Materials with satisfactory mechanical properties are thus chosen, and among these those which have the least impact on the neutron reactions.

In the case of bodies of sodium-cooled fast neutron reactor assemblies, the steels chosen are stainless steels of austenitic, ferritic or ferritic/martensitic grades.

As for the pressure tube function, the thickness of steel is chosen which is appropriate for the internal pressure.

Consequently, the current assembly bodies consist of a monolithic tube with a hexagonal section, the material of which is the least unfavourable for the neutron balance, and the thickness of which is able to withstand the internal pressure.

In the case of fourth-generation reactors, an improvement of performance and an improvement of core safety are sought, notably during accidental sequences.

It is sought, notably, to produce assembly bodies with increased resistance to thermal creep and to the effects of high, fast fluence (E>0.1 MeV).

The effect of fast fluence is to degrade the mechanical properties and to cause deformations, for example a radiation creep and swelling.

The stainless steels used currently are suitable for the operating temperature range 380° C.-700° C., which is the temperature range of RNR-na reactors. Outside this normal operating temperature range, the mechanical properties of steel rapidly degrade around 850° C.-900° C., which are temperatures which can be attained by RNR-gas reactors, which greatly degrades the capacity of the body to maintain its mechanical functions.

The melting point of steel is around 1400° C., i.e. well below that of the fuel.

Refractory materials exist which are capable of withstanding these temperature levels; however they are incompatible from a neutron standpoint.

It is, consequently, one aim of the present invention to provide a nuclear fuel assembly, and more specifically an assembly body, capable of meeting the mechanical conditions at temperatures higher than those of the operating temperatures, and in which there is minimal presence of materials which are unfavourable to neutron reactions in the reactor core.

ACCOUNT OF THE INVENTION

The aim set out above is attained by a composite assembly body comprising end elements connected by a metal structure with slots, and a central cylinder made from a ceramic material, the negative influence of which on the neutron reactions is reduced, and where this material can even have a positive influence.

In other words, the assembly body comprises two metal end sleeves, an external metal structure which is perforated over the fissile height, and an internal structure made from a ceramic material constituting the hydraulic channel over the fissile height.

By producing a composite body, it is possible to achieve a functional optimisation of each sub-assembly.

Through use of the present invention, it is possible to optimise the choice of the constituent materials in order to improve the neutron balance of the fissile volume of the core through its atomic composition by reducing the presence of species negatively influencing the balance, and by increasing more favourable species, with a positive influence, or at least a less negative influence. Indeed, by producing an openwork frame which has only a mechanical role, it is possible substantially to reduce the volume fraction of materials having a negative influence on the neutron balance.

By means of this structure with ceramic sleeves, the flow of fluid cooling the bundle of fuel elements is confined, whilst at the same time the hydraulic sections are controlled in the top part of the bundle. In addition, the tubular geometry produced in this fashion forms a continuous or near-continuous wall around the bundle, guaranteeing that the axial flow is contained in the bundle. In the case of a near-continuous wall, a certain acceptable rate of radial leaks can appear close to the inter-assembly zones.

Advantageously, the shape of the joint planes between the ceramic segments, and their positioning facing non-perforated sections of the frame are such that they enable the radial leaks to be regulated.

The subject-matter of the present invention is then mainly a nuclear fuel assembly body intended to contain nuclear fuel pins, where said body of lengthways axis comprises a first tubular sleeve and a second tubular sleeve made from a metal material form the lengthways ends of the assembly body, where a frame made from a metal material connects the first and second sleeves, where the frame is openworked, and where a ceramic tubular internal structure is positioned between the first and second sleeve inside the frame.

In an example embodiment, the internal structure prevents any leakage of the cooling fluid intended to pass along it.

In another example embodiment, the internal structure comprises calibrated leakage zones.

For example, the internal structure comprises segments which are superimposed lengthways, where the two segments positioned at both ends of the internal structure partially penetrate into the first and second sleeves.

Advantageously, the segments are socketed into one another.

The lengthways ends of the socketed segments may have, in the case of one, a groove and, in the case of the other, a rib of a matching shape.

The frame is formed, for example, by the assembly of struts defining windows.

The frame can comprise axial and crossways struts.

Advantageously, the crossways struts cover zones where the segments are connected.

The frame can be attached to the sleeves by welding and/or a mechanical assembly, where the latter is, for example, of the dovetail type.

The frame according to the present invention can be formed by a tube perforated with drill holes forming circular or oblong slots.

In a variant the internal structure can be formed from plates attached on to the frame so as to block the windows of said frame.

The assembly body according to the present invention advantageously comprises a device for compensating for an axial gap between the end of the end section and the second sleeve intended to be located in the upper part of the assembly. The latter is, for example, formed from a washer with undulations of amplitude 5 mm inserted between the end section and the second upper sleeve.

Advantageously, the assembly body has a regular hexagonal transverse section.

The internal structure is, for example, made of SiC, fibre-reinforced SiC or MAX-phases of the $Ti_3SiC_2$ type.

In the case of an assembly body for a sodium-cooled fast neutron reactor, the sleeves and the frame can be made of austenitic, ferritic or ferritic/martensitic stainless steel.

As a variant, the sleeves can be made of 316 Ti standard austenitic steel, and the frame of EM10.

In the case of an assembly body for a gas-cooled fast neutron reactor, the sleeves and the frame can be made from refractory metals.

Another subject-matter of the present invention is an assembly comprising a foot, an assembly body according to the present invention, nuclear fuel pins positioned in the assembly body and an upper neutron protection, where the body is attached to the foot and to the upper neutron protection in the area of the first and second sleeves respectively, for example by welding.

BRIEF DESCRIPTION OF THE ILLUSTRATIONS

Figure 2:
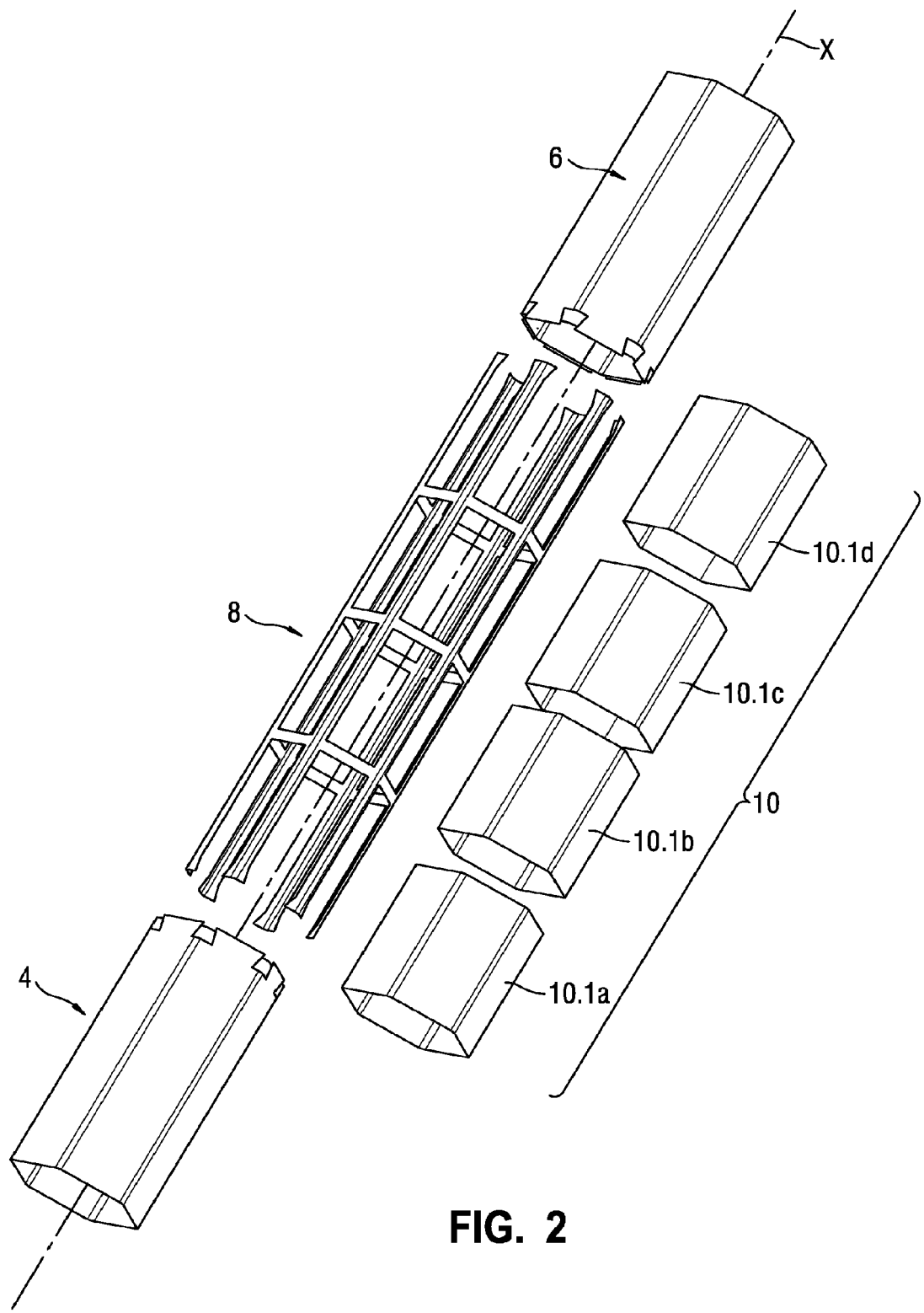
Figure 3:
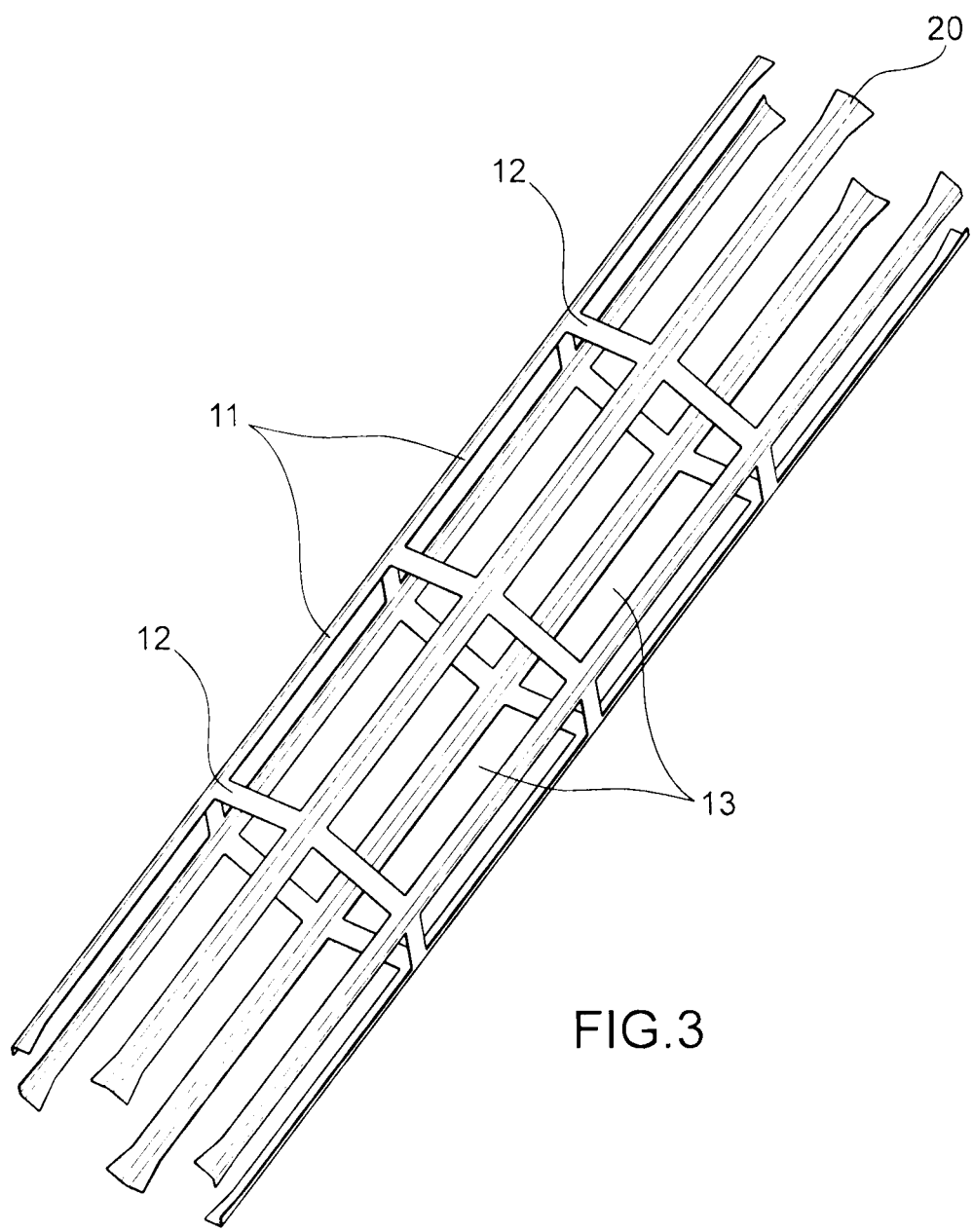
Figure 4:
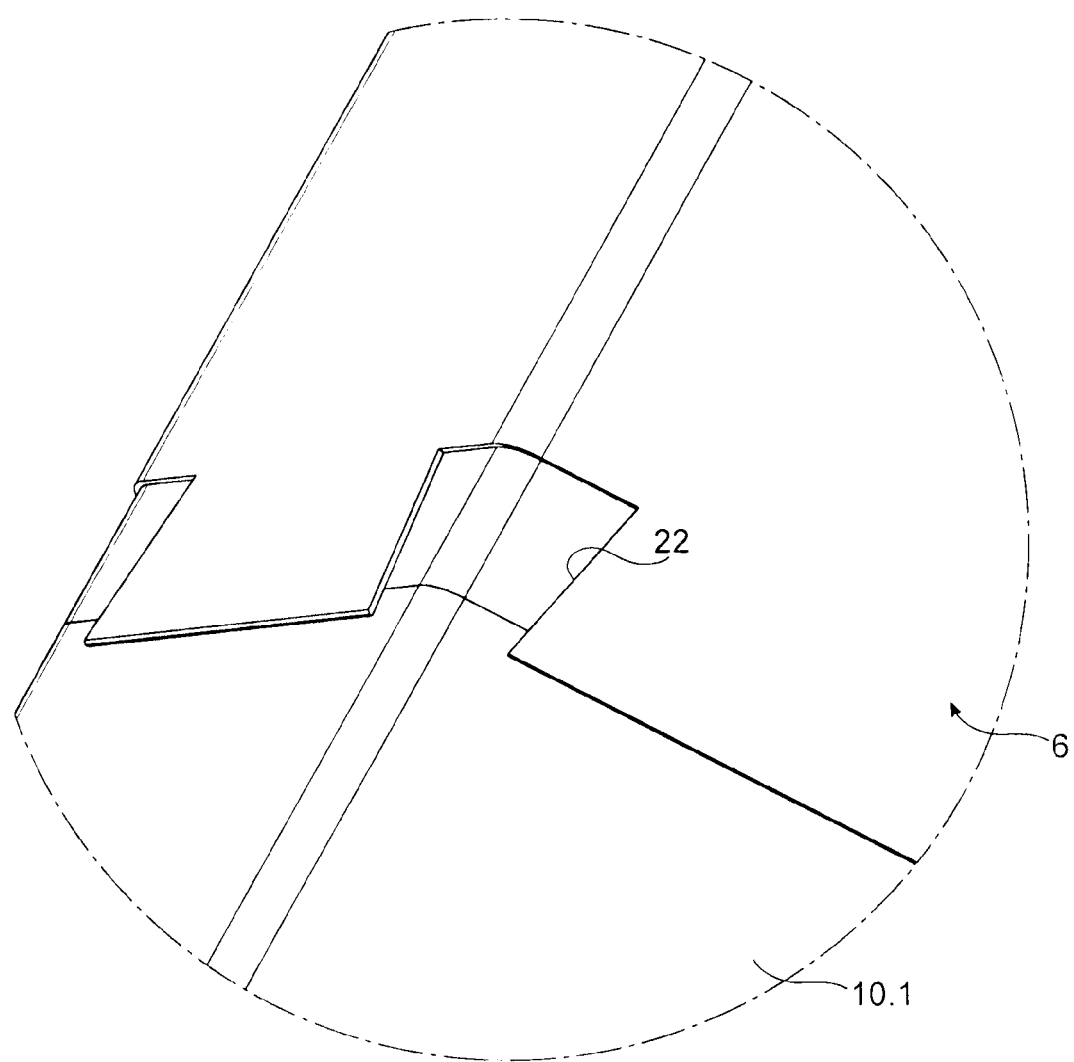
Figure 5:
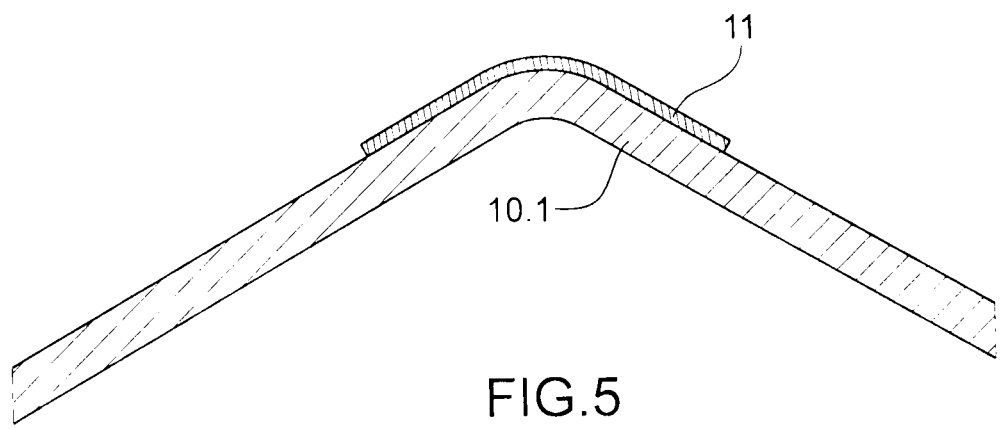
Figure 6:
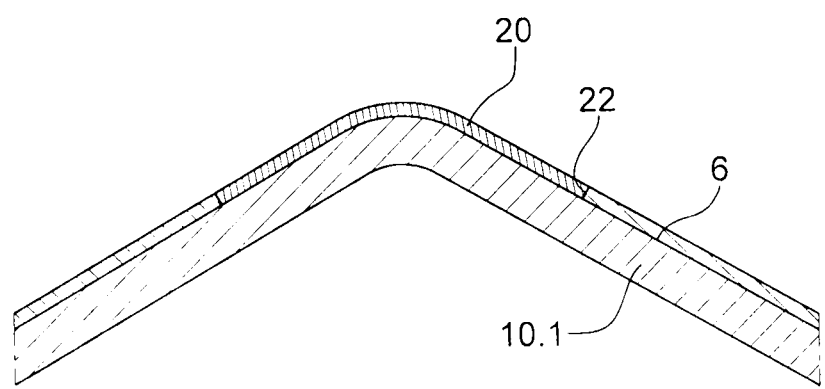
Figure 7:
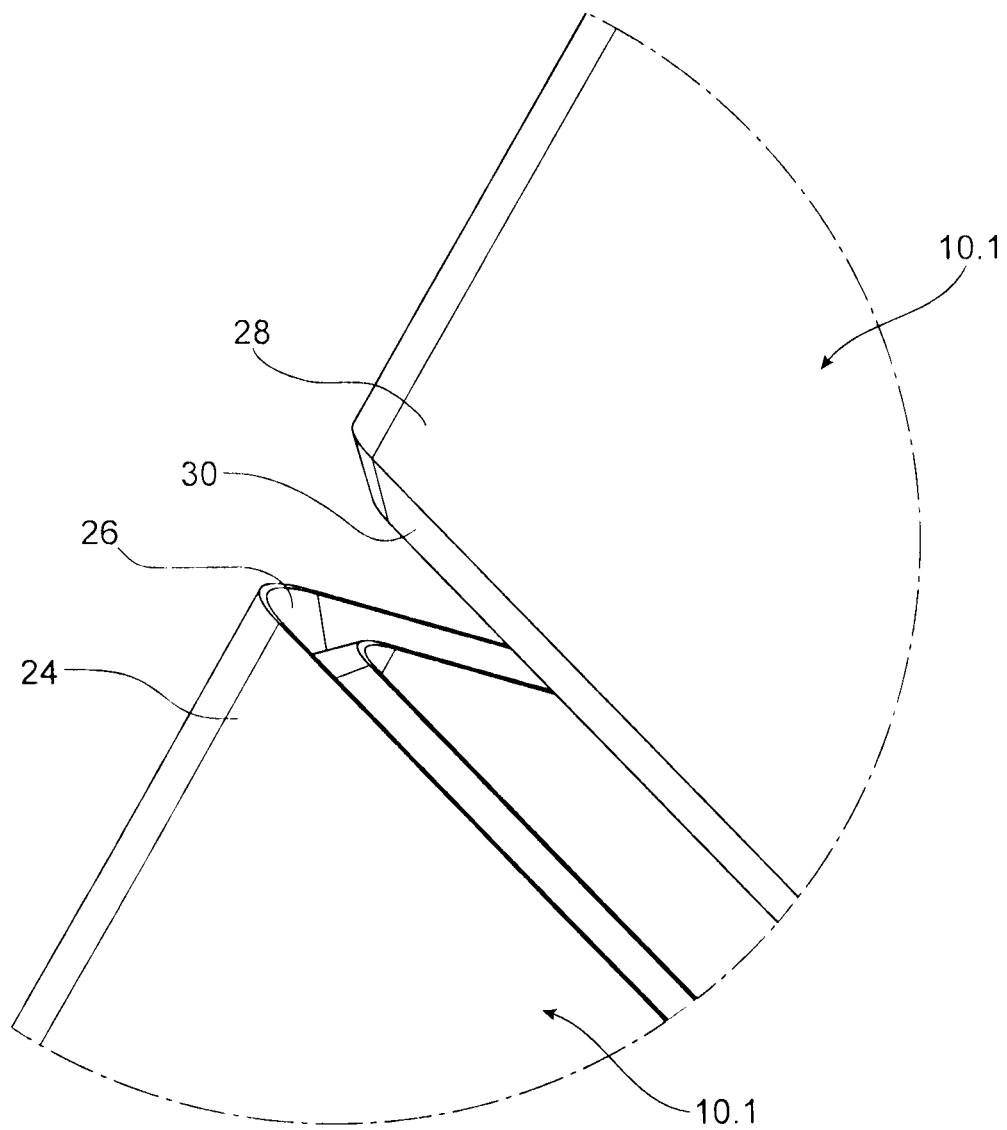
Figure 8:
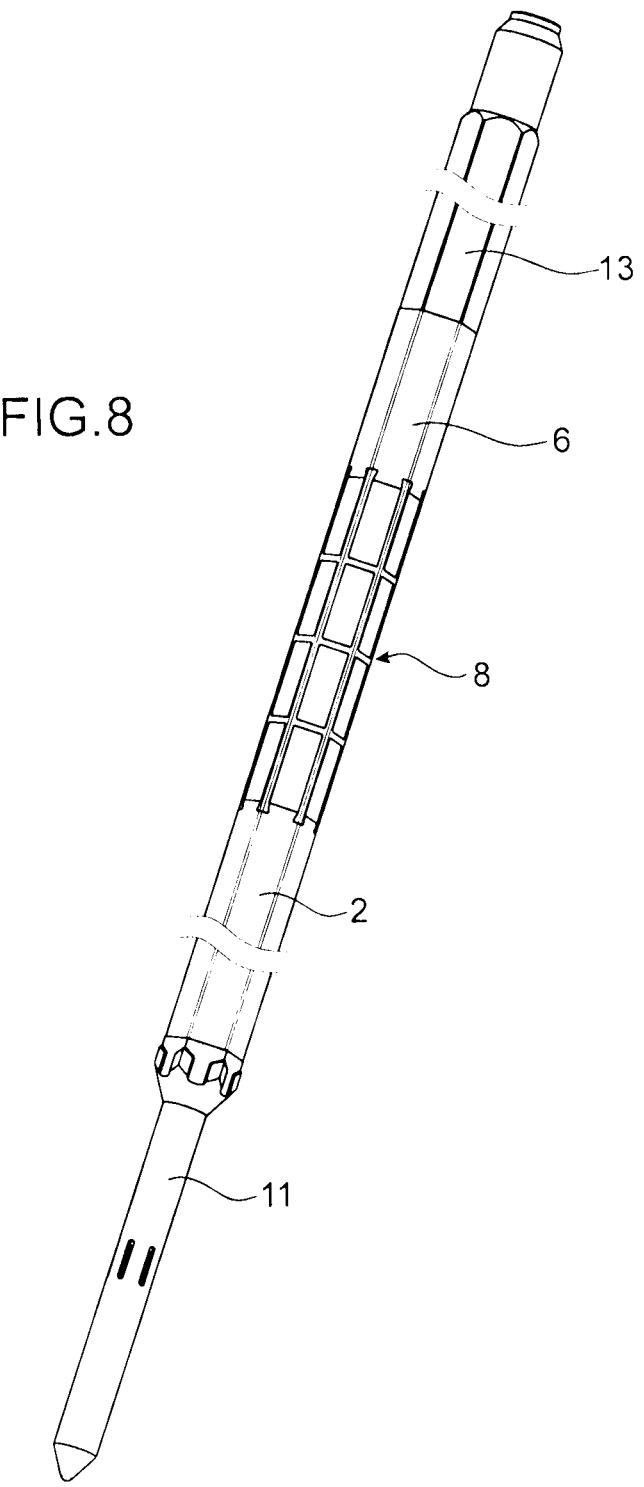
Figure 9:
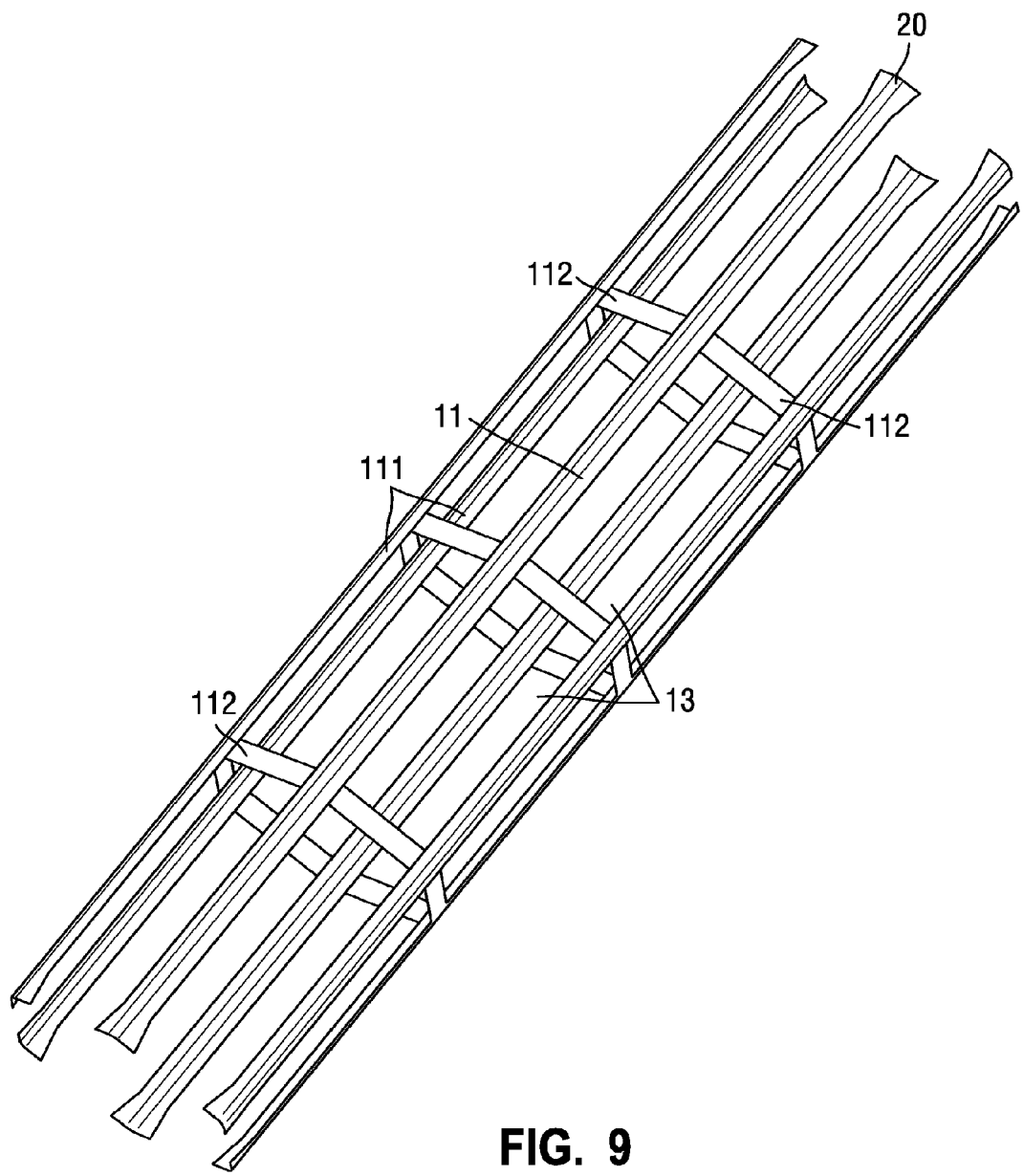
Figure 10:
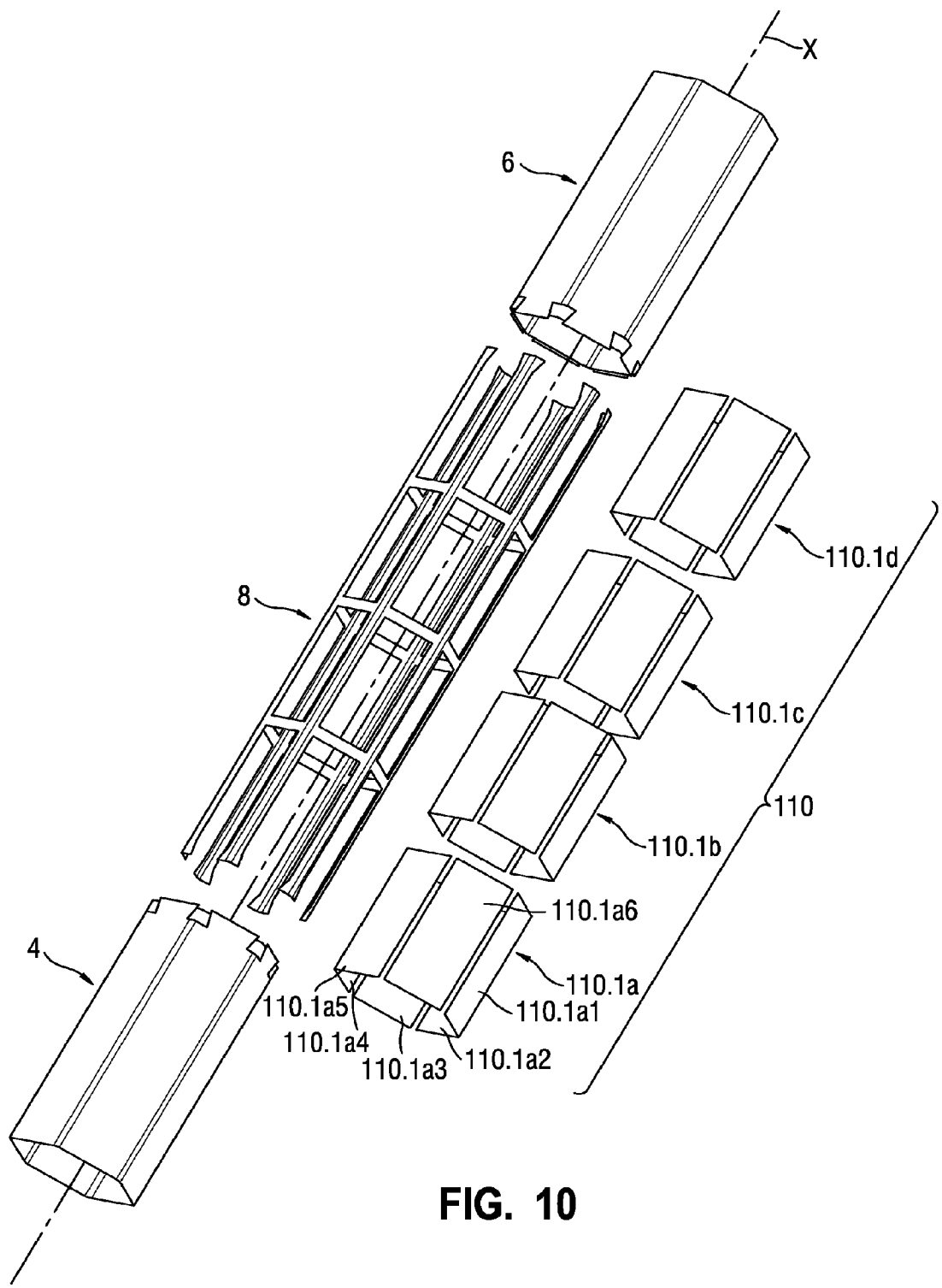
Figure 11:
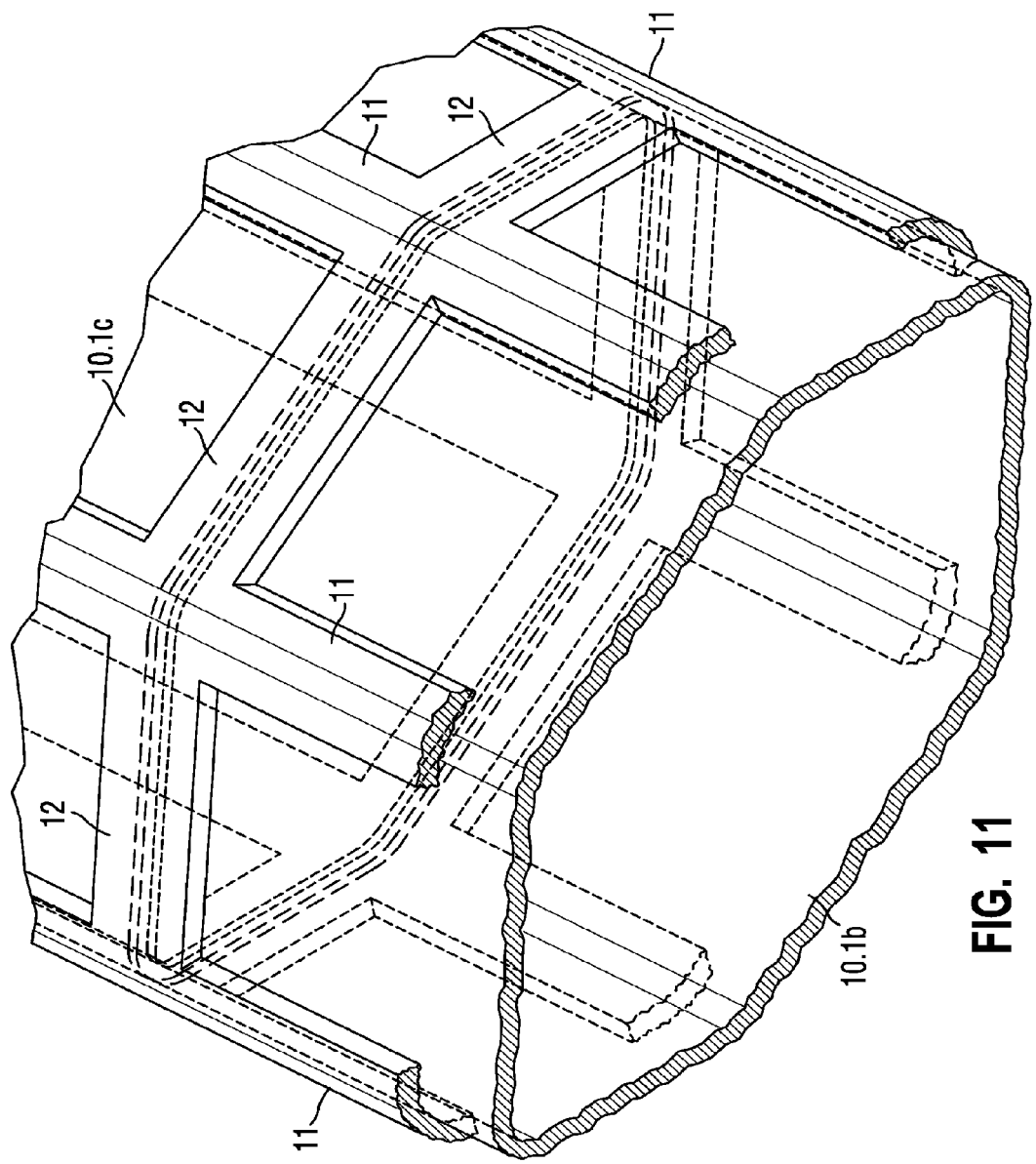
Figure 12:
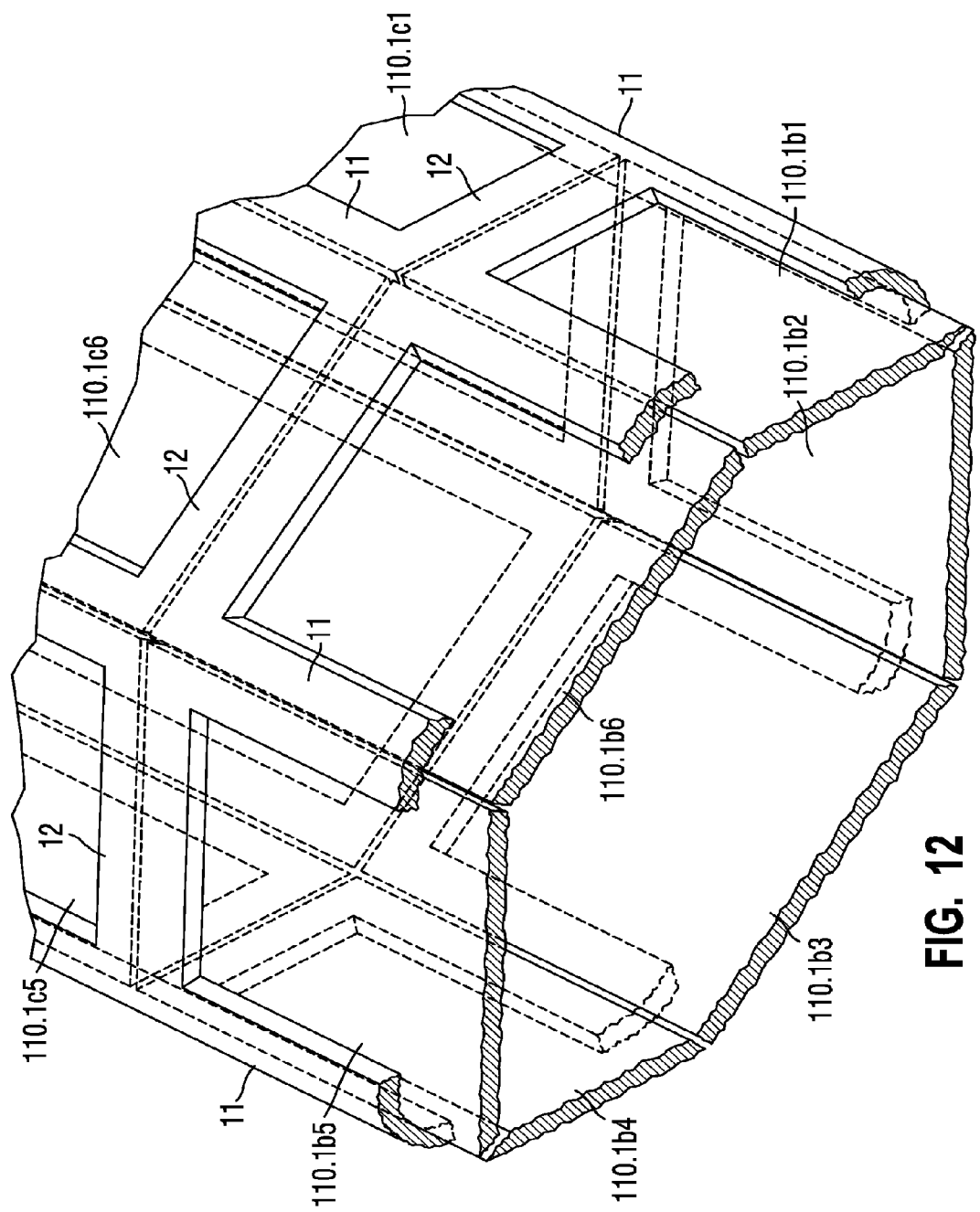
Figure 13A:
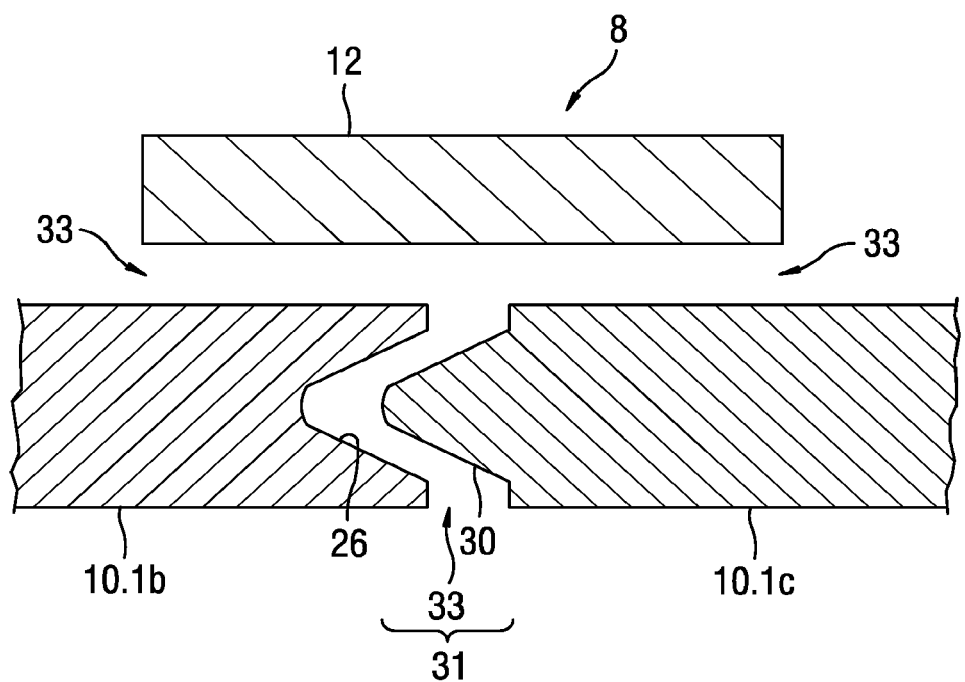
Figure 13B:
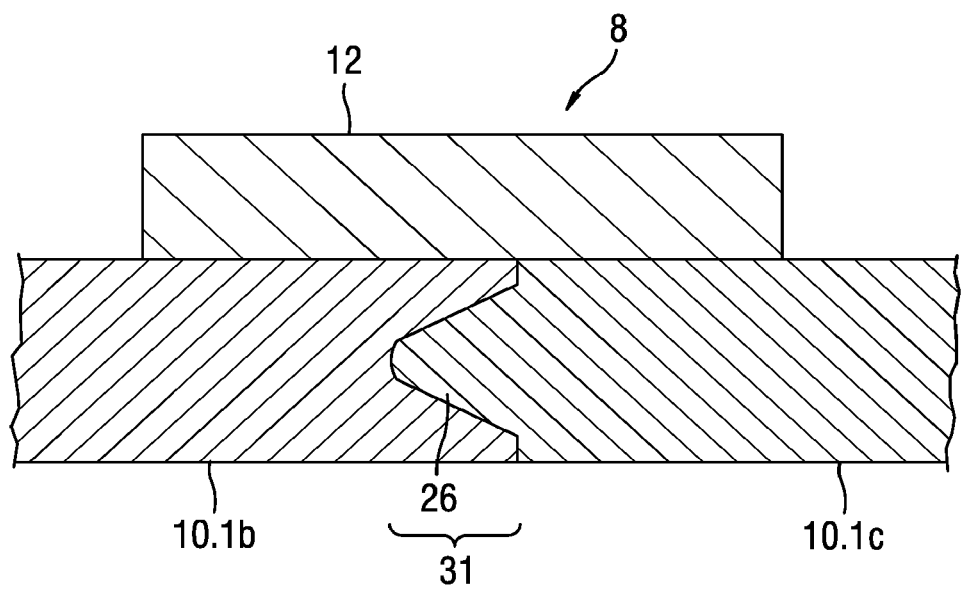
Figure 14A:
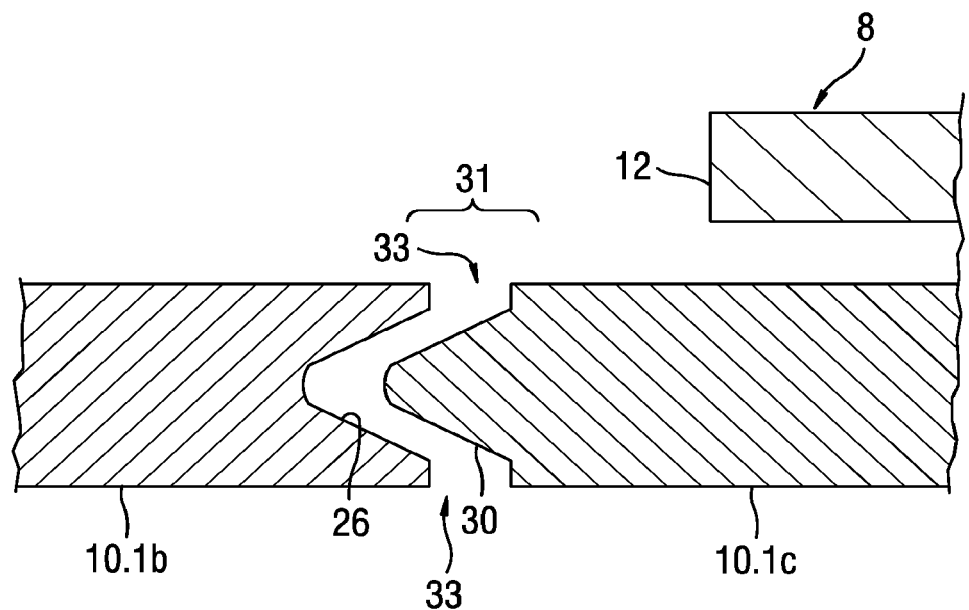
Figure 14B:
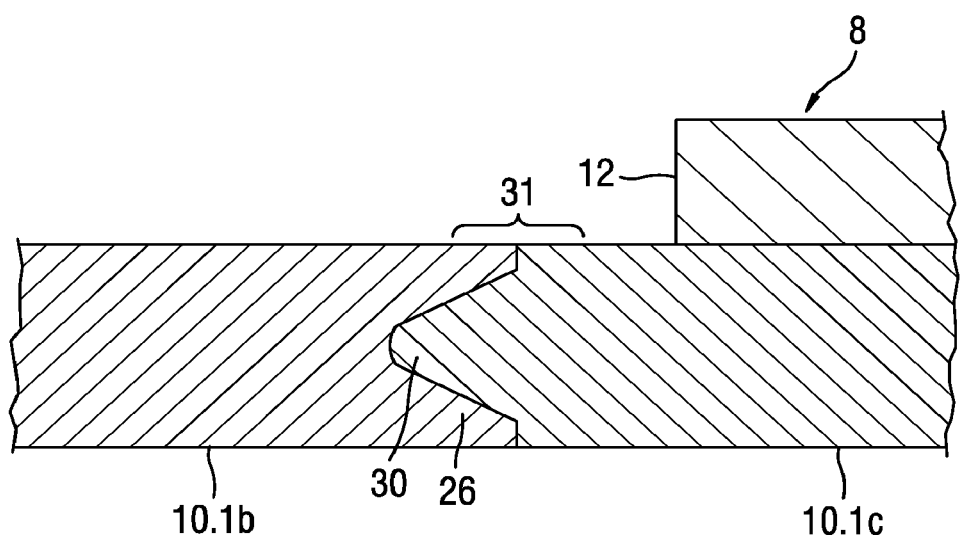
Figure 15A:
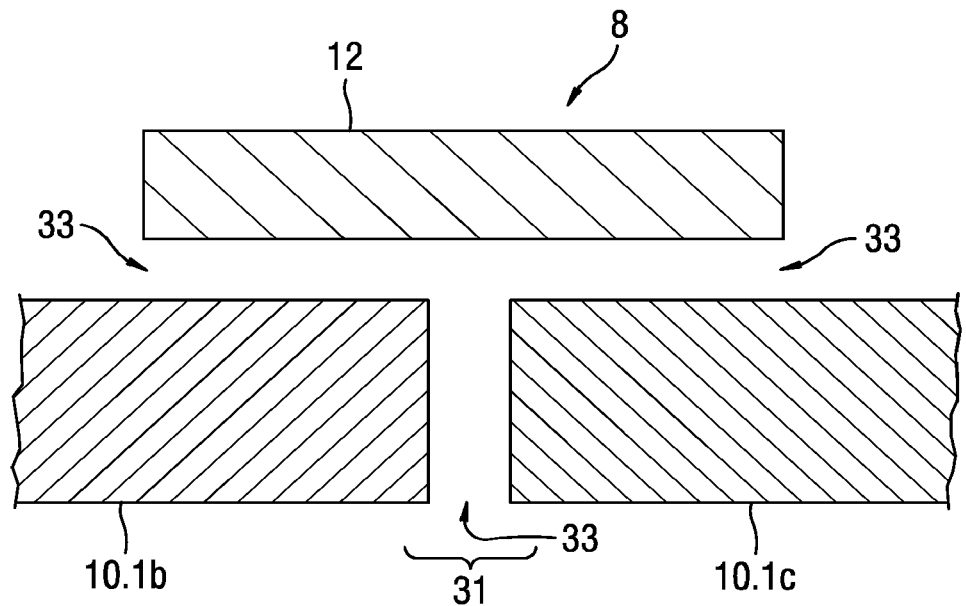
Figure 15B:
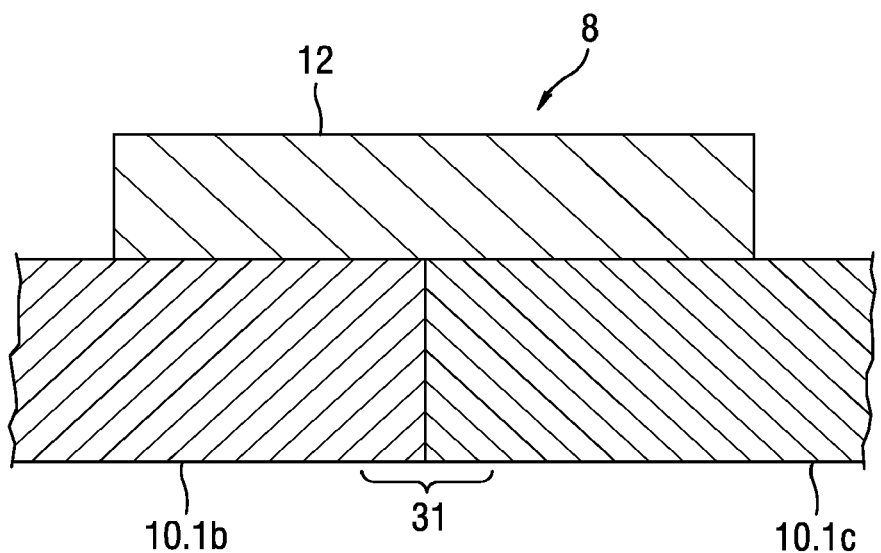
Figure 16A:
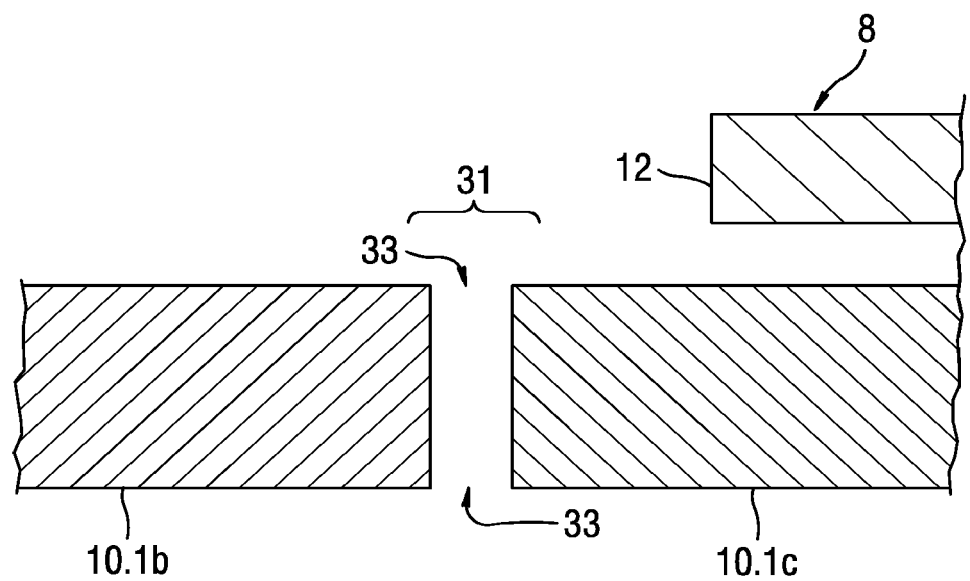
Figure 16B:
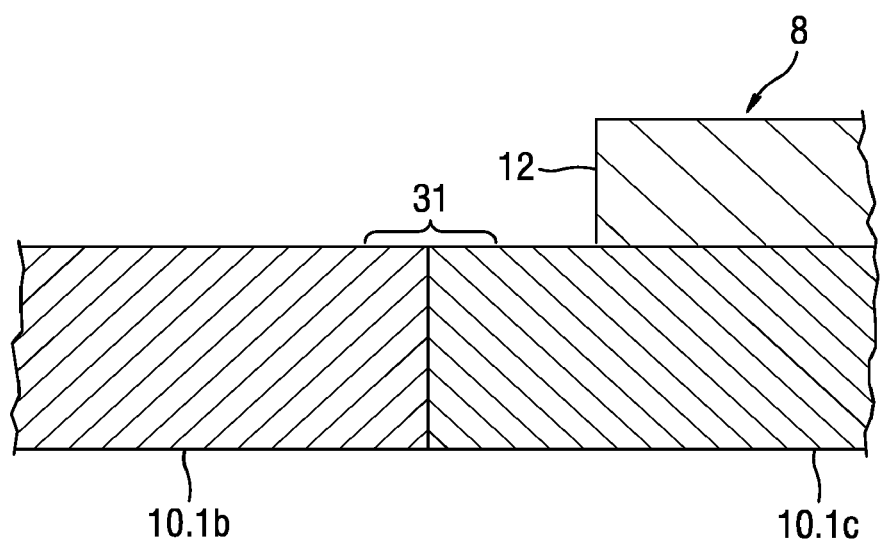

The present invention will be better understood using the description which follows and the appended illustrations, in which:

FIG. 1 is a perspective view of an example embodiment of an assembly body according to the present invention, FIG. 2 is an exploded view of the assembly body of FIG. 1, FIG. 3 is a perspective view of the frame of the body, FIG. 4 is a detailed view of a zone of connection between various elements of the body according to the present invention, FIG. 5 is a transverse section view in plane A-A, FIG. 6 is a transverse section view in plane B-B, FIG. 7 is a detailed view of the zone of connection between two sections of the internal structure in the separated position, FIG. 8 is a perspective view of an assembly according to the present invention FIG. 9 is a perspective view of a frame of a body according to another example embodiment, FIG. 10 is an exploded view of an assembly according to yet another example embodiment, FIG. 11 is a detailed partial cutaway view of the assembly body of FIG. 1, FIG. 12 is a detailed partial cutaway view of an assembly body according to the yet another example embodiment of FIG. 10, FIG. 13A is a detailed partial section view in plane C-C of a connection zone according to an embodiment including an annular groove and an annular rib on adjoining lengthways ends of the segments in a non-expanded state and spaced apart from the frame, wherein the transverse strut covers the connection zone, FIG. 13B is a detailed partial section view according to the embodiment of FIG. 13A with the segments in an expanded state and pressed against the frame, FIG. 14A is a detailed partial section view in plane C-C of a connection zone according to an embodiment including an annular groove and an annular rib on adjoining lengthways ends of the segments in a non-expanded state and spaced apart from the frame, wherein the transverse struts are staggered axially relative to the connection zones, FIG. 14B is a detailed partial section view according to the embodiment of FIG. 14A with the segments in an expanded state and pressed against the frame, FIG. 15A is a detailed partial section view in plane C-C of a connection zone according to an embodiment including flat or beveled axial ends of the segments in a non-expanded state and spaced apart from the frame, wherein the transverse strut covers the connection zone, FIG. 15B is a detailed partial section view according to the embodiment of FIG. 14A with the segments in an expanded state and pressed against the frame, FIG. 16A is a detailed partial section view in plane C-C of a connection zone according to an embodiment including flat or beveled axial ends of the segments in a non-expanded state and spaced apart from the frame, wherein the transverse struts are staggered axially relative to the connection zones, FIG. 16B is a detailed partial section view according to the embodiment of FIG. 16A with the segments in an expanded state and pressed against the frame.

DETAILED ACCOUNT OF PARTICULAR EMBODIMENTS

In FIG. 1 an assembly body 2 according to the present invention can be seen intended to receive within it nuclear fuel pins to form an assembly.

In FIG. 8, the complete assembly according to the present invention can be seen; the pins are not visible.

The assembly body is designed to be positioned vertically when it is in the core.

Assembly body 2 according to the present invention with lengthways axis X has a first sleeve 4 of axis X intended to form the lower end of body 2, a second sleeve 6 of axis X intended to form the upper end of body 2, a frame 8 of axis X connecting first sleeve 4 and second sleeve 6, and an internal structure between first sleeve 4 and second sleeve 6 and positioned inside frame 8.

In the assembly, first sleeve 4 is mechanically connected to the foot of assembly 11 intended to be housed in the reactor's diagrid, and second sleeve 6 is connected to upper neutron protection 13.

The assembly is cooled by circulation of a fluid from base to top, for example gas in the case of an RNR-G reactor or sodium in the case of an RNR-Na reactor.

The cooling fluid enters through the foot, traverses first sleeve 4, internal structure 10 and second sleeve 6, and exits from the assembly through the upper neutron protection.

The height of internal structure 10 is such that the structure extends over the entire fissile height, i.e. the zone receiving the fuel pins. Frame 8 also extends over the entire fissile height.

In the represented example, and advantageously, body 2 has a regular hexagonal section, enabling a high volume density of fissile nuclei to be obtained. However, a body having a transverse section of another shape does not fall outside the scope of the present invention, for example one of circular section.

According to the invention, the frame is positioned outside the body and forms an external framework mechanically holding the body.

The frame provides the mechanical connection between the foot of the assembly via first sleeve 4 and the upper neutron protection via second section 6.

Frame 8 withstands the bending moments to ensure beam resistance of the assembly, the torsional moments to maintain the alignment of tubular segments over the height of the assembly, and the axial forces due to the weight of the structures, under traction and compression when the assembly is handled.

FIG. 3 shows frame 8 which comprises lengthways struts 11 and transverse struts 12, where these struts 11 and 12 define windows 13. FIG. 9 shows frame 8 which comprises lengthways struts 111 and transverse struts 112, where these struts 111 and 112 define windows.

In the represented example, the six faces of frame 8 each comprise four rectangular-shaped windows.

Other window shapes are conceivable, such as holes, for example, distributed according to the mechanical stresses to which the frame is subject.

The frame represents a very small volume of the body, which minimises its volume fraction in the fissile volume of the core. In addition, as we shall see below, it enables the cooling fluid to pass into the inter-assembly zones.

Advantageously, to construct frame 8 a material is used which has mechanical properties such that plasticity and in thermal creep ductilities are greater than or equal to 0.2% and such that the toughness $K_{IC}$ is greater than or equal to 20 MPa·m$^{1/2}$.

The material of the frame is chosen such that these mechanical properties are present taking account of the exposure to the maximum fluence of the core and of the operating temperature conditions. The frame is made from a metal material, for example stainless steel. The steel is chosen such that it does not expand, or expands only slightly, with the core fluence, such as stainless steel of a ferritic/martensitic grade, EM10 for example.

The atomic composition of the materials used for the frame is preferably favourable to the neutron balance, both during normal operation and in accidental situations, and for the post-use cycles from the standpoint of the excitation level.

The frame is made, for example, by welding rods one to another, by making windows in a sheet metal which is then shaped into a tube, or by making windows directly in a tube.

The sleeves are made of metal materials and are welded on to the ends of the frame. Sleeves 4, 6 are roughly identical. Sleeves 4, 6 have a section which is roughly identical to that of frame 8, and make an internal passage for the flow of the cooling fluid.

Sleeves 4, 6 are positioned respectively below and above the fissile zone; they are not therefore greatly exposed to the neutron flow of the fuel pins. Consequently, the material or materials constituting them need merely be resistant to moderate radiation conditions. Indeed, the local fluence to which they are subject is less than half the core's maximum fluence.

The sleeves are made from a metal material, for example stainless steel. The same materials can be chosen as for the frame; however, as was mentioned above, since the sleeves are subject to lesser neutron flows, their properties can then be adjusted to these conditions.

End sleeves 4, 6 are attached to the ends of frame 8. In the example represented in FIGS. 1 and 4, the sleeves and the frame are assembled by a dovetail joint connection and a welding step is undertaken to make the connection even more robust. To this end, the transverse edges of windows 13 located at the ends of the frame are not closed, since a transverse strut is missing; ends 18 of the axial struts are then free, and have flaring shapes 20 which fit into recesses 22 of corresponding shapes made in the ridges of sleeves 4, 6. A weld is then made.

It is clearly understood that any other type of assembly is conceivable.

The welds between the frame and the sleeves are located outside the fissile zone. They are not therefore greatly exposed to the neutron flow, which would probably degrade their mechanical resistance.

It is clearly understood that an assembly body in which the frame and the sleeves are secured only by welding or by a mechanical assembly does not fall outside the scope of the present invention.

In FIG. 6 a section view in plane A-A of the dovetail assembly can be seen.

The internal structure of the body is made from a ceramic material defining a channel, in which the pins are positioned, and in which the cooling fluid flows from base to top.

In the example represented in FIG. 2, internal structure 10 consists of tubular segments 10.1 of hexagonal section, for example four such (10.1a, 10.1b, 10.1c, 10.1d), positioned one on top of the other along axis X within the frame.

This segment-based structure is more specifically adapted to RNR-Na reactors, in which the sodium pressure is relatively high, since the segments are more capable of withstanding these pressure levels.

Segments 10.1 are advantageously socketed into one another; to this end the axial ends of the segments are advantageously configured to allow such socketing.

In FIG. 7 an example of such socketing can be seen.

For example, each segment 10.1 comprises a lengthways end 24 fitted with an annular groove 26 of hexagonal shape and a lengthways end 28 fitted with an annular rib 30 the shape of which matches that of groove 26.

Advantageously, rib 30 has a triangular transverse section, facilitating socketing and centring of the segments. In addition, this shape restricts the leakage of the cooling fluid outside the assembly by forming a baffle for the fluid; the flow of the fluid between the segments is therefore impeded.

It is clearly understood that segments 10.1 comprising flat or bevelled axial ends do not fall outside the scope of the present invention.

In addition, the end portions of internal structure 10 penetrate into sleeves 4, 6, as can be seen in FIG. 6.

It is possible either to make an assembly of segments 10.1 forming a duct which prevents any leakage of the cooling fluid, or a duct which prevents most leakage, where the fluid flows towards the inter-assembly zones.

The presence of a certain flow in the inter-assemblies spaces can be beneficial for the overall cooling thermal hydraulics of the core, in normal operation and/or in accidental situations.

In the represented example shown in FIGS. 1, 13A, 13B, 15A, and 15B, the connection zones 31 between segments 10.1 are covered by transverse struts 12 of frame 8; the effect of this covering is to restrict the leaks of cooling fluid, as we shall see below. Transverse struts 12 could also be staggered axially relative to the connection zones 31 as shown in FIGS. 14A, 14B, 16A, and 16C.

Advantageously, the inner faces of the adjacent walls of the segments are connected by a fillet, the diameter of which is roughly equal to that of the pins of the bundle, so as to define a hydraulic channel of roughly constant section between the inner face of the segment and the pins located on the outside of the bundles.

The external ridges also have a radius of curvature, as can be seen in FIGS. 5 and 6.

The outer faces of the segments are advantageously recessed relative to the external surface of the assembly body, which reduces the risks of impact for the ceramic segments whilst it is transported and handled.

Segments 10.1 define a channel for the cooling fluid.

The junction between segments 10.1 does not necessarily prevent all leakage, as indicated above.

However, in the event of a leak, it is sought to obtain calibrated leaks through calibrated leakage zones 33 between the segments 10.1, 110.1, in order to control the cooling flow.

These leaks from the interior of the assembly to the exterior cause fluid to flow between the assemblies.

The leakage flow is comprised in the calculation of the flow at the inlet of the assembly, in order to control the hydraulic cooling flow.

The appearance of leaks in the form of erosive jets is prevented by producing shapes such as those described above, which are capable of causing a laminar leak, preventing damage to the connection zones 31 between the segments.

In addition, due to this possibility of the fluid flowing between the segments, in the case of a plug in the lower portion of the assembly preventing the cooling fluid from penetrating into the assembly, the fluid can penetrate into the assembly between two segments and cool the pins in degraded fashion.

In addition, due to the structure a dynamic form of leak prevention is obtained. Indeed, in operation, and more specifically while the pressurised cooling fluid is flowing, the segments tend to expand under the effect of the pressure of the cooling fluid, and are pressed against frame 8, the frame being such that its struts cover the connection zones 31 of segments 10.1, as explained above.

The entire unit then forms a pressure-seal gasket.

This production of a modular assembly body then enables the choice of materials of each module to be optimised.

Segments 10.1 of the internal structure are made of a ceramic material, which has a very high melting temperature, close to the melting temperature of the fuel. In addition, the ceramic material is relatively rigid; its expansion under the effect of the pressure of the cooling fluid is then limited, enabling the flow rate within the assembly to be better controlled.

Segments 10.1 can be made from SiC—SiCf or from MAX-phases of the $Ti_3SiC_2$ type.

MAX-phases materials are nano-lamellar ceramics combining some properties of ceramic materials and some properties of metals.

SiC has a melting temperature of the order of 2000° C., which is higher than that of steel. In addition, it has a moderating effect within the core, enabling core runaway to be limited.

Advantageously, the segments are made from fibre-reinforced SiC (SiCf), which is even more resistant to the internal pressure applied by the cooling fluid.

The internal structure made from segments is able to resist the internal high pressure required to establish the bundle cooling flow, which is of the order of 3 to 5 bar for a RNR-Na reactor, and of the order of 1 to 1.5 bar for a RNR gas reactor.

In addition, the ceramic materials of the internal structure retain sufficient mechanical resistance at high temperatures to resist the internal high pressure of the cooling fluid.

The internal structure according to the present invention maintains the confinement of the fissile bundle cooling flow in the field of the high temperatures which can be reached in accidental situations, which range from the operating temperature to the melting temperature of the fuel.

In addition, in an accidental situation, the internal structure is the first structure in contact with the fuel elements.

Due to the high melting temperature of the ceramic materials, by maintaining its integrity it provides a certain mitigation of the accident by limiting the possibilities of fuel displacement, notably radially in the events of local melting of a bundle.

SiC/SiCf and $Ti_3SiC_2$ type MAX-phases composites have suitable mechanical properties in terms of resistance and toughness, and ensure mechanical fuel bundle confinement up to some 2000° C.

In addition, from the neutron standpoint, these materials lead to a more favourable neutron balance the than a metal in normal operation.

Furthermore, in addition to its neutral "transparency", SiC/SiCf provides a flow-moderating effect which improves the Doppler coefficient which comes into play in accidental transients.

In terms of variation of potential core reactivity in an accidental melt situation, the replacement of a portion of the assembly body made of steel by SiC/SiCf significantly reduces the variation of reactivity caused by draining the molten steel. In assemblies of the state of the art, the volume fraction of the steel in the fissile zone consists of the sheaths of the fuel elements and of the assembly body. By means of the invention, production of a portion of the assembly body using SiC/SiCf reduces the volume fraction of steel, and therefore the associated draining effect.

The assembly body according to the present invention is assembled as follows:
  segments 10.1 installed in frame 8,
  end sleeves 4 and 6 socketed in the lengthways ends of frame 8, using a clip-on system, and
  welding at the sockets.

It may also be conceived to produce the internal structure in the form of plates blocking the windows of frame 8; such an embodiment is more specifically suitable for a RNR gas reactor: since the gas pressure is lower, the plates can be less thick. Referring to FIG. 10, each of segments 110.1a, 110.1b, 110.1c, and 110.1d may be made-up of plates. For example, 110.1a is made-up of 110.1a1, 110.1a2, 110.1a3, 110.1a4, 110.1a5, 110.1a6. The other segments 110.1b, 110.1c, and 110.1d, are likewise made-up of plates. However, for convenience, only the reference numerals for segment 110.1a are shown in FIG. 10.

For example, these plates are assembled in runners in the frame.

For example the plates are made from SiC, and the frame and the sleeves from vanadium.

We shall now describe an example embodiment which is more specifically suitable for a fourth-generation sodium-cooled fast neutron reactor.

The dimensioning was calculated on the basis of the following conditions:
  a pitch of the fuel assemblies network or inter-assembly gap of 210.8 mm,
  a distance between flats internal to the assembly body, in the case of a tube with a hexagonal section, which is defined by the size of the fuel bundles of 197.3 mm,
  a fissile height of the core of 1000 mm,
  an internal sodium high pressure in the assembly body of 0.34 MPa,
  a sodium temperature of 395° C. when entering the core, and of 550° C. when leaving the core,
  a maximum fluence (E>111 keV) of $3.3.10^{27}$ n·m².

The internal distance between flats is the distance separating two parallel faces of the internal surface of a hexagon, and the external distance between flats is the distance separating two parallel faces of the external surface of a hexagon.

On the basis of these dimensional and operational conditions, the characteristics of the various elements of the assembly body according to the present invention can be as follows:
  first sleeve 4 and second sleeve 6 are made from a 316 Ti standard austenitic steel having an external distance between flats of 207.8 mm and an internal distance between flats of 197.3 mm, i.e. a thickness of 5.25 mm,
  frame 8 is made of EM10 steel, with an external distance between flats of 207.8 mm and an internal distance between flats of 205.8 mm, i.e. a thickness of 1 mm. The frame is openworked. The dimensions of the windows are 230 mm×99 mm.
  the internal structure is made from a fibre-reinforced SiC—SiC composite ceramic material, formed from four segments extending over the fissile height, having an external distance between flats of 204.8 mm, and an internal distance between flats of 198.3 mm, i.e. a thickness of 3.25 mm.

Advantageously, to control the geometry of the assembly body during manufacture, whilst complying with the functional tolerance intervals, the body can be made in the form of segments 250 mm in height.

The above dimensions were determined taking account of the various properties of the materials under the operating conditions in the core. Indeed, the metals used for frame 8 and first and second sleeves 4 and 6 expand more than SiC—SiCf.

The expansion coefficient of SiC—SiCf is $4.10^{-6}$ and that of EM10 steels and of the sheathing of the fuel pins is between $12.10^{-6}$ and $14.10^{-6}$.

To accommodate these differential expansions between the fuel bundle and the internal structure made of SiC, the distance between flats of segments 10.1 is 198.3 mm, i.e. 1 mm greater than that of the distance between flats of first and second sleeves 4, 6. The segments are fitted into the sleeves which have a machined socketing bore suitable for the external dimension of the segments, allowing for an assembly gap. For example, the internal dimension of the bore is 205.8 mm and the external dimension of the segments is 204.8 mm.

The gap between the pin bundle and the assembly body is therefore increased by 1 mm facing the internal wall of the segments to prevent interaction at the operating temperature.

In addition, the material of the frame and that of the segments have different expansions when subject to flows: at the sought fluence EM10 will expand only at the end of its lifetime. Conversely, SiC—SiCf expands from the moment when it is first irradiated, for example when for the first time a fast fluence of the order of $0.34.10^{25}$ n/m2 is reached.

SiC—SiCf very quickly reaches its saturation volume expansion value which is of the order of 1% to 1.5% at the operating temperature between 400° C. and 550° C.

To accommodate this expansion of the SiC at the start of the lifetime without a strong interaction with frame 8 made of EM10 there is a gap between the external surface of the segments and the internal surface of frame 8.

For example, an initial gap of 1 mm is allowed, with an internal distance between flats of the EM10 frame of 205.8 mm and an external distance between flats of the SiC segments of 204.8 mm.

In addition, an axial gap is advantageously allowed in the bore where the end of the segment is socketed into the second sleeve.

The latter has, for example, a depth such that it makes an axial gap of 5 mm when the unit is assembled.

Advantageously, an axial gap compensation device is comprised between the end of the segment and the second sleeve, to hold the segments in a contiguous position before the assemblies are installed in the reactor, notably during the transport and handling operations.

For example, the compensation device can take the form of a thin washer having undulations of amplitude 5 mm inserted between the axial stack of the segments and the upper second sleeve.

At the start of operation the washer is crushed when the segments are subject to axial expansion.

For example, the thickness of the segments is of the order of 3.5, enabling the stress level in the segments to be minimised under the effect of the internal pressure. In addition, the connection fillets in the area of the internal ridges of the segments can measure 5 mm to prevent stress concentrations, and to regulate the hydraulic diameter of the cooling channel of the corner pin of the bundle.

The assembly body according to the present invention, with the elements having the dimensions given above, therefore has the following dimensions:
  an external distance between flats of 207.8 mm,
  an internal distance between flats of 197.3 mm with 198.3 mm locally in the upper part of the SiC TH,
  a clearance in the network pitch of 3 mm.

The dimensions of a metal monolithic assembly body made of EM10 of the state of the art suitable for this same core are given below:
  an external distance between flats of 206.3 mm,
  an internal distance between flats of 197.3 mm,
  a clearance in the network pitch (inter-assemblies clearance): 4.5 mm.

On the basis of these dimensions, the volume fractions of materials in the fissile volume of the core of a monolithic assembly body made of steel of the state of the art and an assembly body according to the present invention were calculated and are presented in the table below:

| | VOLUME FRACTION IN THE FISSILE ZONE | | |
|---|---|---|---|
| | Metal | Sodium | SiC—SiCf |
| Monolithic assembly body | 8.17% | 4.22% | 0% |
| Metal/SiC SiCf assembly body | 0.44% | 6.05% | 5.9% |

It can therefore be seen that, by means of the present invention, the volume fraction of metal is greatly reduced, since it is 0.44% instead of 8.17% in the case of the assembly body of the state of the art, which is mainly attributable to the contribution of a significant volume fraction of the SiC—SiCf material having improved neutron properties, i.e. improved neutron "transparency" and a moderating effect.

The presence of sodium in the recesses of frame 8 slightly increases by 1.8% the volume fraction of sodium of the inter-assemblies space.

A neutron evaluation of the effects of this modification of the volume fractions of the materials constituting the assembly body, in comparison with a metal monolithic assembly body, shows for the core for a given staying time:
  a gain for the sodium draining coefficient of 0.3%,
  a gain for the Doppler coefficient of 10%,
  a slight gain for regeneration gain and for Pu investment,
  a comparable rate of damage for the sheaths of the fuel elements,
  a rate of damage for the SiC of 186 dpa-SiC, compared to 145 dpa for the reference metal TH.

Regeneration Gain, GR, is the ratio between the final number of fissile atoms and the initial number of fissile atoms; when GR is >1, breeding is said to occur; more fissile matter is produced than is consumed. This is, for example, the case of an RNR reactor with production of Pu239 from the fertile U238 with, at the end of the process, more Pu239 than at the start.

Dpa or displacement per atom expresses the radiation damage incurred by a material subject to a fast neutron flow; it quantifies statistically the number of times that an atom of the material is subject to a displacement under the impact of a fast neutron (of energy greater than 0.1 MeV).

In addition, the substantial reduction of the volume fraction of metal also has effects in an accidental melting situation since when the molten steel is drained in the case of melting the variation of the reactivity caused by this drainage is significantly reduced.

The assembly body according to the present invention, whilst satisfying the specifications of existing assembly bodies, therefore enables the core's neutron operation parameters during normal operation, or incidental operation, which qualifies operational incidents occurring more frequently than $10^{-2}$/year, and accidental operation, to be improved significantly.

It also contributes elements which mitigate accidents which may lead to the melting of the fuel, by strengthening the overall degree of refractoriness of the core structure materials, and by reducing their reactivity influence while the accident is occurring.

The assembly body according to the present invention can easily be adapted to gas-cooled fast neutron reactors, for example by making the sleeves and the frame from refractory metals such as NbZrC, or semi-refractory metals such as vanadium, for example.

It may be decided to make the frame and the sleeves from the same metal, satisfying the most severe conditions applied to the frame; however, for reasons of cost different materials are preferably chosen, the properties of which are adjusted to the conditions of use, since the material of the sleeves have lesser properties in terms of neutron flow resistance.

In the case of an assembly body intended to be used in an RNR-Na reactor for which the operating temperatures are within the range 350° C.-700° C., the metal parts such as the frame and the sleeves are made from austenitic, ferritic and ferritic/martensitic stainless steels, and the ceramic internal structure can be made from SiC—SiCf or MAX-phases of the $Ti_3SiC$ type.

In the case of an assembly body intended to be used in an RNR-gas reactor for which the operating temperatures are within the range 350° C.-900° C., the metal parts such as the frame and the sleeves can be made from refractory metals, and the ceramic internal structure can be made from SiC—SiCf or MAX-phases of the $Ti_3SiC_2$ type.

Except for the internal ceramic structure, the present invention has the advantage that there is no requirement to develop new materials, but that existing materials may be used, the properties of which have previously been tested in reactor assemblies.

The invention claimed is:

1. A nuclear fuel assembly body including a lengthways axis and configured to receive nuclear fuel pins to form a nuclear fuel assembly, said body comprising:
   a frame made from a metal material, the frame being openworked;
   a first sleeve made from a metal material and connected to a first end of the frame;
   a second sleeve made from a metal material and connected to a second end of the frame opposite the first sleeve along the lengthways axis, and
   a ceramic tubular internal structure positioned inside the frame and along the lengthways axis between the first and second sleeves, wherein the ceramic tubular internal structure comprises a plurality of lengthways superimposed segments, including
   a first segment positioned at a first end of the ceramic tubular internal structure and partially penetrating into the first sleeve, and
   a second segment positioned at a second end of the ceramic tubular internal structure, opposite the first end, and partially penetrating into the second sleeve,
   wherein joints between the segments comprise leakage zones.

2. The assembly body according to claim 1, wherein the ceramic tubular internal structure prevents leakage of the cooling fluid intended to traverse it.

3. The assembly body according to claim 1, wherein the segments are socketed into one another.

4. The assembly body according to claim 3, in which the lengthways ends of the socketed segments comprise, in the case of one, a groove and, in the case of the other, a rib of matching shape.

5. The assembly body according to claim 1, wherein the frame is formed by an assembly of struts defining windows.

6. The assembly body according to claim 5, wherein the frame comprises lengthways and transverse struts.

7. The assembly body according to claim 6, wherein
   the transverse struts cover zones where the lengthways superimposed segments are connected.

8. The assembly body according to claim 5, in which the ceramic tubular internal structure is formed from plates attached to the frame so as to block the windows of said frame.

9. The assembly body according to claim 1, wherein the frame is attached to the first and second sleeves by welding.

10. The assembly body according to claim 1, wherein the frame is attached to the first and second sleeves by a mechanical assembly method.

11. The assembly body according to claim 10, wherein the mechanical assembly method is of the dovetail joint type.

12. The assembly body according to claim 1, wherein the frame is formed from a tube perforated with drill holes forming circular or oblong slots.

13. The assembly body according to claim 1, further comprising: a washer with undulations of amplitude 5 mm inserted between an end of an end section of the tubular internal structure and the second sleeve located in an upper part of the assembly.

14. The assembly body according to claim 1, having a regular hexagonal transverse section.

15. The assembly body according to claim 1, in which the ceramic tubular internal structure is made of SiC, fibre-reinforced SiC or MAX-phases of the $Ti_3SiC_2$ type.

16. The assembly body according to claim 1 for a sodium-cooled fast neutron reactor, wherein the sleeves and the frame are made from at least one of austenitic, ferritic, and ferritic/martensitic steels.

17. The assembly body according to claim 1 for a sodium-cooled fast neutron reactor, in which the first and second sleeves are made from 316 Ti standard austenitic steel and the frame from EM10.

18. The assembly body according to claim 1 for a gas-cooled fast neutron reactor, in which the first and second sleeves and the frame are made from refractory metals.

19. An assembly, comprising:
   a foot,
   the assembly body according to claim 1,
   nuclear fuel pins positioned in the assembly body, and
   an upper neutron protection,
   wherein the body is attached to the foot and to the upper neutron protection in the area of the first and second sleeves respectively by welding.

* * * * *